(12) United States Patent
Sethi et al.

(10) Patent No.: US 11,537,459 B2
(45) Date of Patent: Dec. 27, 2022

(54) AUTOMATICALLY PREDICTING DEVICE FAILURE USING MACHINE LEARNING TECHNIQUES

(71) Applicant: EMC IP Holding Company LLC, Hopkinton, MA (US)

(72) Inventors: Parminder Singh Sethi, Punjab (IN); Hung T. Dinh, Austin, TX (US); Bijan K. Mohanty, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 413 days.

(21) Appl. No.: 16/832,035

(22) Filed: Mar. 27, 2020

(65) Prior Publication Data

US 2021/0303378 A1 Sep. 30, 2021

(51) Int. Cl.
*G06K 9/00* (2022.01)
*G06F 11/07* (2006.01)
(Continued)

(52) U.S. Cl.
CPC ........ *G06F 11/0703* (2013.01); *G05B 13/027* (2013.01); *G05B 13/0265* (2013.01);
(Continued)

(58) Field of Classification Search
CPC ............. G06F 11/3006; G06F 11/0748; G06F 11/0751; G06F 11/22–25; G06F 11/008; G06F 11/2263; G06F 11/0766–0787; G05B 2223/06; G05B 23/0283; G05B 2223/04; G05B 23/024; Y04S 40/18; H04M 11/002; H04B 2203/5433; G01K 1/024; H04W 4/70; H04L 67/12; G06Q 10/20; G06K 9/6256; G06K 9/6257; G06K 9/6259; G06K 9/6263; G06N 3/02–126; G06N 20/00–20
See application file for complete search history.

(56) References Cited

U.S. PATENT DOCUMENTS 10,558,547 B2 2/2020 Coatney et al.
10,691,528 B1 * 6/2020 Ferreira .............. G06F 11/0709
(Continued)

FOREIGN PATENT DOCUMENTS

WO WO-2020055386 A1 * 3/2020 ........... G05B 23/024

*Primary Examiner* — Atiba O Fitzpatrick
(74) *Attorney, Agent, or Firm* — Ryan, Mason & Lewis, LLP (57) ABSTRACT

Methods, apparatus, and processor-readable storage media for automatically predicting device failure using machine learning techniques are provided herein. An example computer-implemented method includes obtaining telemetry data from at least one client device; predicting failure of at least a portion of the at least one client device by processing at least a portion of the telemetry data using a first set of one or more machine learning techniques; predicting lifespan information pertaining to at least a portion of the at least one client device by processing the predicted failure and at least a portion of the telemetry data using a second set of one or more machine learning techniques; and performing at least one automated action based at least in part on one or more of the predicted failure and the predicted lifespan information.

20 Claims, 8 Drawing Sheets

(51) Int. Cl.
  *G06N 20/00* (2019.01)
  *G06K 9/62* (2022.01)
  *H04W 4/70* (2018.01)
  *G05B 13/02* (2006.01)
  *H04L 41/16* (2022.01)

(52) U.S. Cl.
  CPC ......... *G06K 9/6256* (2013.01); *G06K 9/6263* (2013.01); *G06N 20/00* (2019.01); *H04W 4/70* (2018.02); *H04L 41/16* (2013.01)

(56) References Cited

U.S. PATENT DOCUMENTS

| | | | |
|---|---|---|---|
| 2017/0344909 A1* | 11/2017 | Kurokawa | G06N 5/04 |
| 2020/0034734 A1 | 1/2020 | Agrawal et al. | |
| 2020/0065688 A1 | 2/2020 | Schmitz et al. | |
| 2020/0090025 A1 | 3/2020 | Cheng et al. | |
| 2020/0112489 A1* | 4/2020 | Scherger | G06F 11/3447 |
| 2020/0382385 A1* | 12/2020 | Vasseur | H04L 41/16 |

* cited by examiner

FIG. 1

```
# importing required libraries
import pandas as pd
from sklearn.naive_bayes import GaussianNB
from sklearn.metrics import accuracy_score read the train and test dataset
train_data = pd.read_csv('train-data.csv')
test_data = pd.read_csv('test-data.csv')

# shape of the dataset
print('Shape of training data :',train_data.shape)
print('Shape of testing data :',test_data.shape)

# Now, we need to predict the missing target variable in the test data
target variable - Survived separate the independent and target variable on training data
train_x = train_data.drop(columns=['Failed'],axis=1)
train_y = train_data['Failed']

# separate the independent and target variable on testing data
test_x = test_data.drop(columns=['Failed'],axis=1)
test_y = test_data['Failed']
```

FIG. 2

```
model = GaussianNB()

# fit the model with the training data
model.fit(train_x,train_y)

# predict the target on the train dataset
predict_train = model.predict(train_x)
print('Target on train data',predict_train)

# Accuracy Score on train dataset
accuracy_train = accuracy_score(train_y,predict_train)
print('accuracy_score on train dataset : ', accuracy_train)

# predict the target on the test dataset
predict_test = model.predict(test_x)
print('Target on test data',predict_test)

# Accuracy Score on test dataset
accuracy_test = accuracy_score(test_y,predict_test)
print('accuracy_score on test dataset : ', accuracy_test)
```

```
import numpy as np
import matplotlib.pyplot as plt from sklearn.ensemble import GradientBoostingRegressor np.random.seed(1)

def f(x):
    """The function to predict."""
    return x * np.sin(x)

#----------------------------------------------------------------------
# First the noiseless case
X = np.atleast_2d(np.random.uniform(0, 10.0, size=100)).T
X = X.astype(np.float32)

# Observations
y = f(X).ravel()

dy = 1.5 + 1.0 * np.random.random(y.shape)
noise = np.random.normal(0, dy)
y += noise
y = y.astype(np.float32)

# Mesh the input space for evaluations of the real function, the prediction and
# its MSE
xx = np.atleast_2d(np.linspace(0, 10, 1000)).T
xx = xx.astype(np.float32)

alpha = 0.95 clf = GradientBoostingRegressor(loss='quantile', alpha=alpha,
                                n_estimators=250, max_depth=3,
                                learning_rate=.1, min_samples_leaf=9,
                                min_samples_split=9)

clf.fit(X, y)
```

FIG. 3

```
# Make the prediction on the meshed x-axis
y_upper = clf.predict(xx)

clf.set_params(alpha=1.0 - alpha)
clf.fit(X, y)

# Make the prediction on the meshed x-axis
y_lower = clf.predict(xx)

clf.set_params(loss='ls')
clf.fit(X, y)

# Make the prediction on the meshed x-axis
y_pred = clf.predict(xx)

# Plot the function, the prediction and the 90% confidence interval based on
# the MSE
fig = plt.figure()
plt.plot(xx, f(xx), 'g:', label=r'$f(x) = x\,\sin(x)$')
plt.plot(X, y, 'b.', markersize=10, label=u'Observations')
plt.plot(xx, y_pred, 'r-', label=u'Prediction')
plt.plot(xx, y_upper, 'k-')
plt.plot(xx, y_lower, 'k-')
plt.fill(np.concatenate([xx, xx[::-1]]),
         np.concatenate([y_upper, y_lower[::-1]]),
         alpha=.5, fc='b', ec='None', label='90% prediction interval')
plt.xlabel('$x$')
plt.ylabel('$f(x)$')
plt.ylim(-10, 20)
plt.legend(loc='upper left')
plt.show()
```

AUTOMATICALLY PREDICTING DEVICE FAILURE USING MACHINE LEARNING TECHNIQUES

FIELD

The field relates generally to information processing systems, and more particularly to device management in such systems.

BACKGROUND

There are commonly many factors that can impact the lifespan of a device and/or components thereof. Such factors include localized contexts such as various user-specific utilizations, and environmental factors such as temperature, humidity, air pressure, vibrations, etc. However, conventional device management approaches typically fail to analyze devices and/or components thereof in connection with such localized contexts and environmental factors. Accordingly, conventional device management approaches face accuracy problems with respect to device failure predictions, which can lead to unnecessary repair or replacement dispatches and/or costs.

SUMMARY

Illustrative embodiments of the disclosure provide techniques for automatically predicting device failure using machine learning techniques. An exemplary computer-implemented method includes obtaining telemetry data from at least one client device, and predicting failure of at least a portion of the at least one client device by processing at least a portion of the telemetry data using a first set of one or more machine learning techniques. The method also includes predicting lifespan information pertaining to at least a portion of the at least one client device by processing the predicted failure and at least a portion of the telemetry data using a second set of one or more machine learning techniques. Further, the method additionally includes performing at least one automated action based at least in part on one or more of the predicted failure and the predicted lifespan information.

Illustrative embodiments can provide significant advantages relative to conventional device management techniques. For example, problems associated with inaccurate device failure predictions are overcome in one or more embodiments through processing dynamic device telemetry data using machine learning techniques to predict device failures and device lifespan information.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
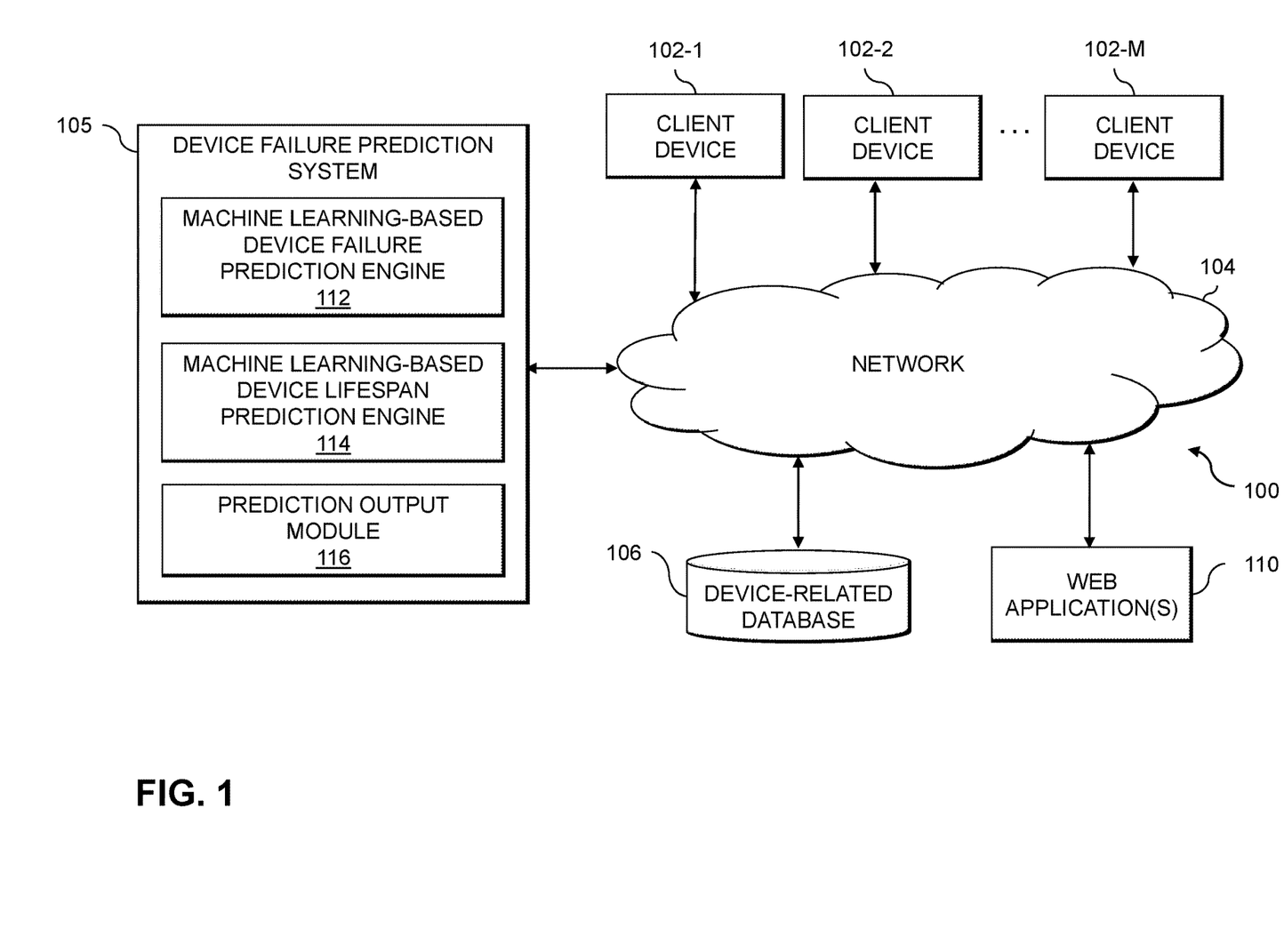
FIG. 1 shows an information processing system configured for automatically predicting device failure using machine learning techniques in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device failure prediction system 105 (which can include, for example, a cloud-based Internet-of-Things (IoT) server) and web application(s) 110. Example web applications, as further detailed herein, can include a parts planning application, a services planning application, a warranty-related application, a service level agreement (SLA) calculation application, etc.

The client devices 102 may comprise, for example, IoT client devices as well as mobile telephones, laptop computers, tablet computers, desktop computers or other types of computing devices capable of obtaining and/or outputting telemetry data. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device failure prediction system 105 can have an associated database 106 configured to store data pertaining to device health and/or lifespan status, which comprise, for example, manufacturing data, service data, parts data, environment and/or weather data, etc.

The database 106 in the present embodiment is implemented using one or more storage systems associated with device failure prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the device failure prediction system 105 can be input-output devices, which illustratively comprise keyboards, displays or other types of input-output devices in any combination. Such input-output devices can be used, for example, to support one or more user interfaces to the device failure prediction system 105, as well as to support communication between the device failure prediction system 105 and other related systems and devices not explicitly shown.

Additionally, the device failure prediction system 105 in the FIG. 1 embodiment is assumed to be implemented using at least one processing device. Each such processing device generally comprises at least one processor and an associated memory, and implements one or more functional modules for controlling certain features of the device failure prediction system 105.

More particularly, the device failure prediction system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the device failure prediction system 105 to communicate over the network 104 with the client devices 102, and illustratively comprises one or more conventional transceivers.

The device failure prediction system 105 further comprises a machine learning-based device failure prediction engine 112, a machine learning-based device lifespan prediction engine 114, and a prediction output module 116.

It is to be appreciated that this particular arrangement of modules 112, 114 and 116 illustrated in the device failure prediction system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automatically predicting device failure and lifespan information using machine learning techniques involving client devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example device failure prediction system 105 in computer network 100 will be described in more detail with reference to the flow diagram of FIG. 4.

As detailed herein, at least one embodiment includes implementing an IoT-based failure prediction management framework to predict the failure and lifespan of a device and/or components thereof. Such an embodiment includes utilizing one or more predictive learning techniques, one or more ensemble learning techniques, and/or one or more machine learning-based boosting techniques, while incorporating external parameters as well as device-level utilization metrics.

As also detailed herein, at least one embodiment includes implementing an intelligent device failure prediction engine which uses Naïve Bayes techniques (e.g., a Gaussian Naïve Bayes classifier algorithm) and at least one supervised learning model. Such an embodiment includes training the Naïve Bayes techniques and/or supervised learning model using device-related telemetry data, product-related data (e.g., supply chain data, service history data, etc.), and/or external factors such as environmental information and utilization information. The trained Naïve Bayes techniques and/or supervised learning model are then used (in accordance with one or more embodiments) to predict at least one device failure and/or device component failure.

One or more embodiments include implementing a device lifespan prediction engine, which uses at least one gradient boosting regression technique in connection with device-related telemetry information, environmental information, and utilization data to predict the lifespan of a given device and/or components thereof. In such an embodiment, the telemetry data can include log and alert information from the device, as well as utilization details such as on/off statistics, install-move-add-change (IMAC) information, hardware and software configuration changes to the device, network changes, ambient temperature proximate to the device, ambient humidity proximate to the device, vibration levels detected proximate to the device, etc.

In accordance with one or more embodiments, environmental information (e.g., temperature data, humidity data, etc.) is collected via one or more sensors. Such sensors, in at least one embodiment, are embedded in the client device (e.g., IoT device) and/or positioned on or proximate to the client device.

Figure 2:
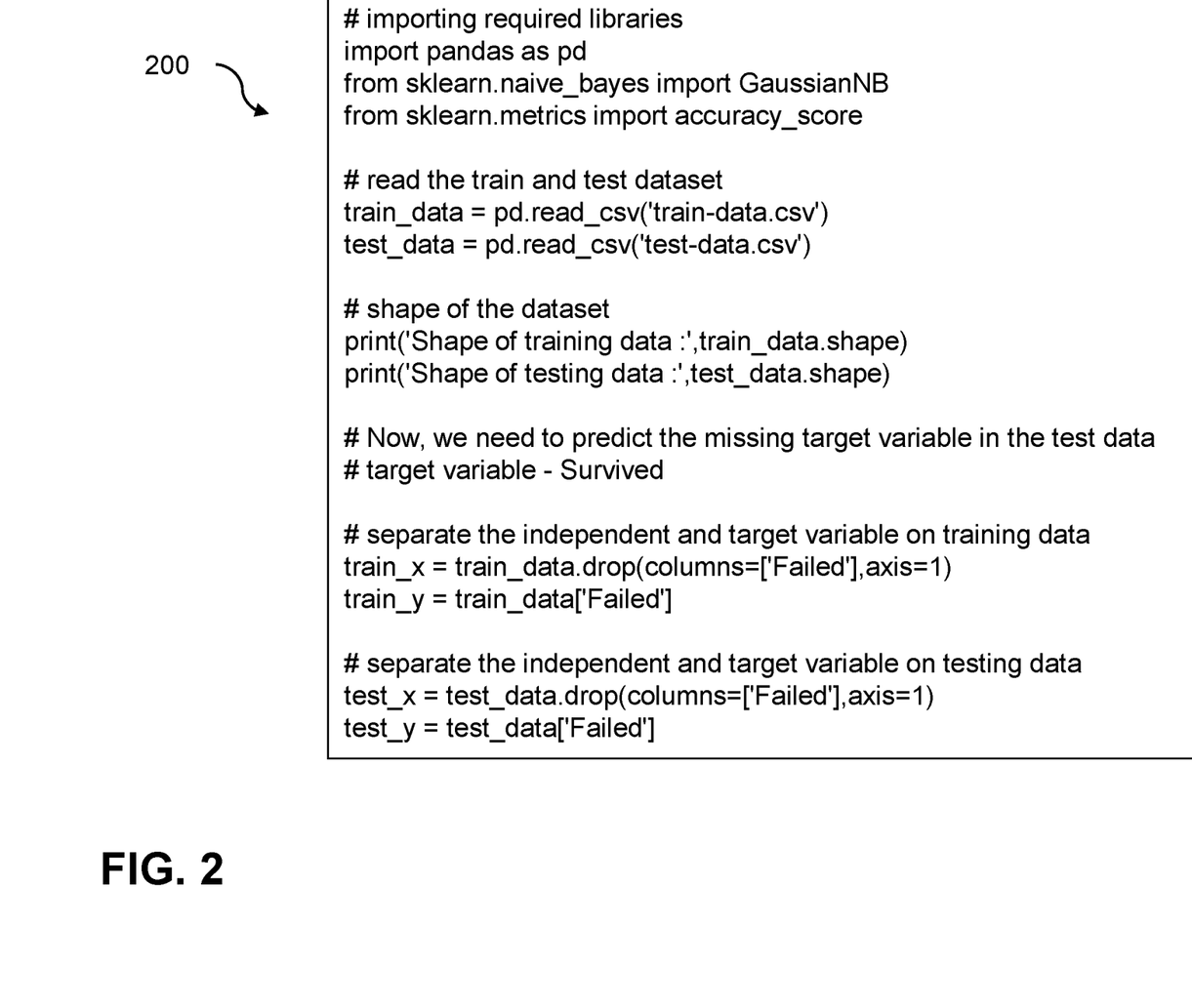
FIG. 2 shows an example code snippet for implementing at least a portion of a device failure prediction engine in an illustrative embodiment.

FIG. 2 shows an example code snippet for implementing at least a portion of a device failure prediction engine in an illustrative embodiment. In this embodiment, example code snippet 200 is executed by or under the control of at least one processing system and/or device. For example, the example code snippet 200 may be viewed as comprising a portion of a software implementation of at least part of device failure prediction system 105 of the FIG. 1 embodiment.

The example code snippet 200 illustrates a Gaussian Naïve Bayes algorithm for predicting the failure of a device or part thereof using historical data (e.g., device type, manufacturer, installation and failure dates, etc.). The example code 200 uses Python and SciKitLearn libraries to implement a Gaussian Naïve Bayes model to train and test using system telemetry data. In this example embodiment, Jupyter Notebook is used as the integrated development environment (IDE) to develop and test the code, and Pandas and Numpy are used for multi-dimensional container manipulation.

As depicted in FIG. 2, in code snippet 200, SciKitLearn libraries are imported and training data as well as test data are uploaded (train_data=pd.read_csv('train-data.csv'); test_data=pd.read_csv('test-data.csv')). In an example embodiment, approximately 80% of the total data can be used as the training data and approximately 20% of the total data can be used as the test data. Also, as shown in FIG. 2, a Gaussian Naïve Bayes classifier is created using at least one SciKitLearn library (model=GaussianNB( )).

As additionally illustrated in FIG. 2, after the Gaussian Naïve Bayes classifier is created, it is trained by passing the training data (model.fit(train_x,train_y)). After the model is fully trained using the training data, the model is called to predict a failure using the test data (predict_test=model.predict(test x)), and a model accuracy score is subsequently calculated (accuracy_test=accuracy_score(test_y,predict_test)).

It is to be appreciated that this particular example code snippet shows just one example implementation of implementing at least a portion of a device failure prediction engine, and alternative implementations of such a process can be used in other embodiments.

A device failure prediction engine, in accordance with one or more embodiments, processes data collected via a client device (e.g., an IoT device). Such data (e.g., ambient temperature data, humidity data, resource utilization data, error logs, system alerts, IMAC data, etc.), which can be captured and/or obtained via sensors embedded in or proximate to the client device, are provided to a cloud-based IoT server for processing and learning for future prediction iterations. Within the cloud-based IoT server, a device failure prediction engine uses at least one Naïve Bayes classifier and at least one probabilistic supervised machine learning algorithm to determine the probability of a device failure and/or device component failure (i.e., posterior failure) based at least in part on prior determined probabilities (e.g., an error has already occurred). Such a determined probability can also include, in one or more embodiments, a determined likelihood value corresponding thereto. By way of illustration, machine learning models, for example, can include generating an accuracy value associated with a determined and/or output probability, wherein such an accuracy value can depend at least in part on the underlying accuracy of the model. Likelihood of an outcome, as used herein, indicates the accuracy value (e.g., percentage) of the model. In the event of a failure prediction, at least one embodiment can further include sending one or more notifications to an entity such as, for example, a customer relationship management (CRM) system, for proactive case and/or dispatch actions.

Figure 3:
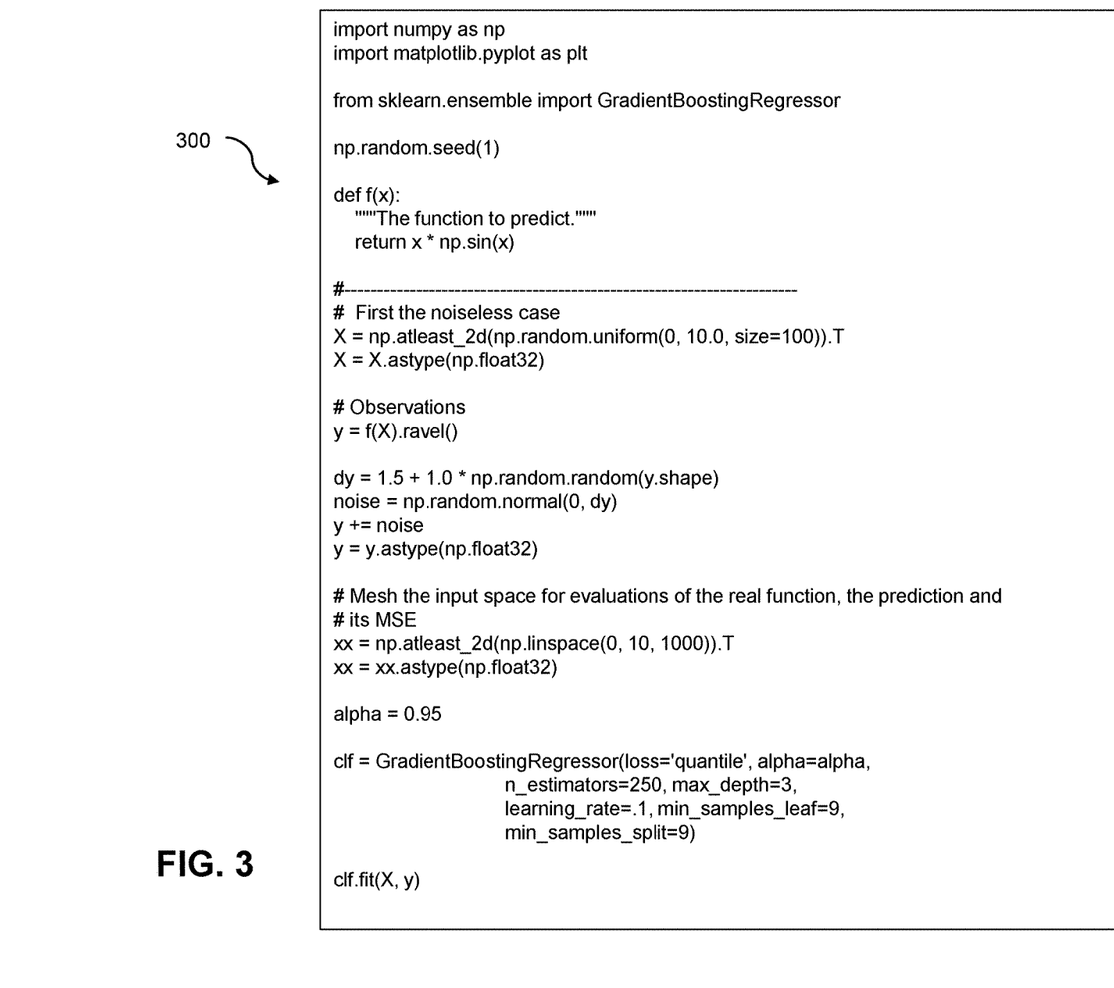
FIG. 3 shows an example code snippet for implementing at least a portion of a device lifespan prediction engine in an illustrative embodiment.

FIG. 3 shows an example code snippet for implementing at least a portion of a device lifespan prediction engine in an illustrative embodiment. In this embodiment, example code snippet 300 is executed by or under the control of at least one processing system and/or device. For example, the example code snippet 300 may be viewed as comprising a portion of a software implementation of at least part of device failure prediction system 105 of the FIG. 1 embodiment.

The example code snippet 300 illustrates using a gradient boosting regression technique to calculate the lifespan of a device or part thereof based on historical data. Code snippet 300 uses Python and SciKitLearn libraries to implement a gradient boosting regressor model to train and test using system telemetry data (to predict the lifespan of a device or part thereof). Also, Jupyter Notebook is used as the IDE to develop and test the code.

As depicted in FIG. 3, in code snippet 300, code libraries are imported (import numpy as np; import matplotlib.pyplot as plt; .from sklearn.ensemble import GradientBoostingRegressor). Also, as illustrated, a gradient boosting regression model is created (clf=GradientBoostingRegressor (loss='quantile', alpha=alpha, n_estimators=250, max_depth=3, learning_rate=0.1, min_samples_leaf=9, min_samples_split=9), and the model is trained using historical training data (clf.fit(X, y)). Subsequently, the model is queried to predict the device lifespan using test data (y_pred=clf.predict(xx)). Resulting data is then plotted on MatPlotLib libraries.

It is to be appreciated that this particular example code snippet shows just one example implementation of implementing at least a portion of a device lifespan prediction engine, and alternative implementations of such a process can be used in other embodiments.

In at least one embodiment, a device lifespan prediction engine includes multiple artificial intelligence (AI) techniques. Such AI techniques can include a supervised machine learning algorithm such as a gradient boosting regressor, an ensemble method in which a number of predictors are aggregated to form a final prediction and a boosting method wherein the predictors are trained sequentially. An example regressor, such as noted above, calculates a prediction of the lifespan of the device and/or part thereof by factoring localized contextual information such as utilization information, environmental informational, etc.

By way of example, at least one embodiment includes utilizing such a lifespan prediction engine to predict the next (pre-failure) dispatch date for the device and/or component in question. Additionally, in such an embodiment, the next dispatch prediction can be modified and/or updated as the related telemetry data changes.

Figure 4:
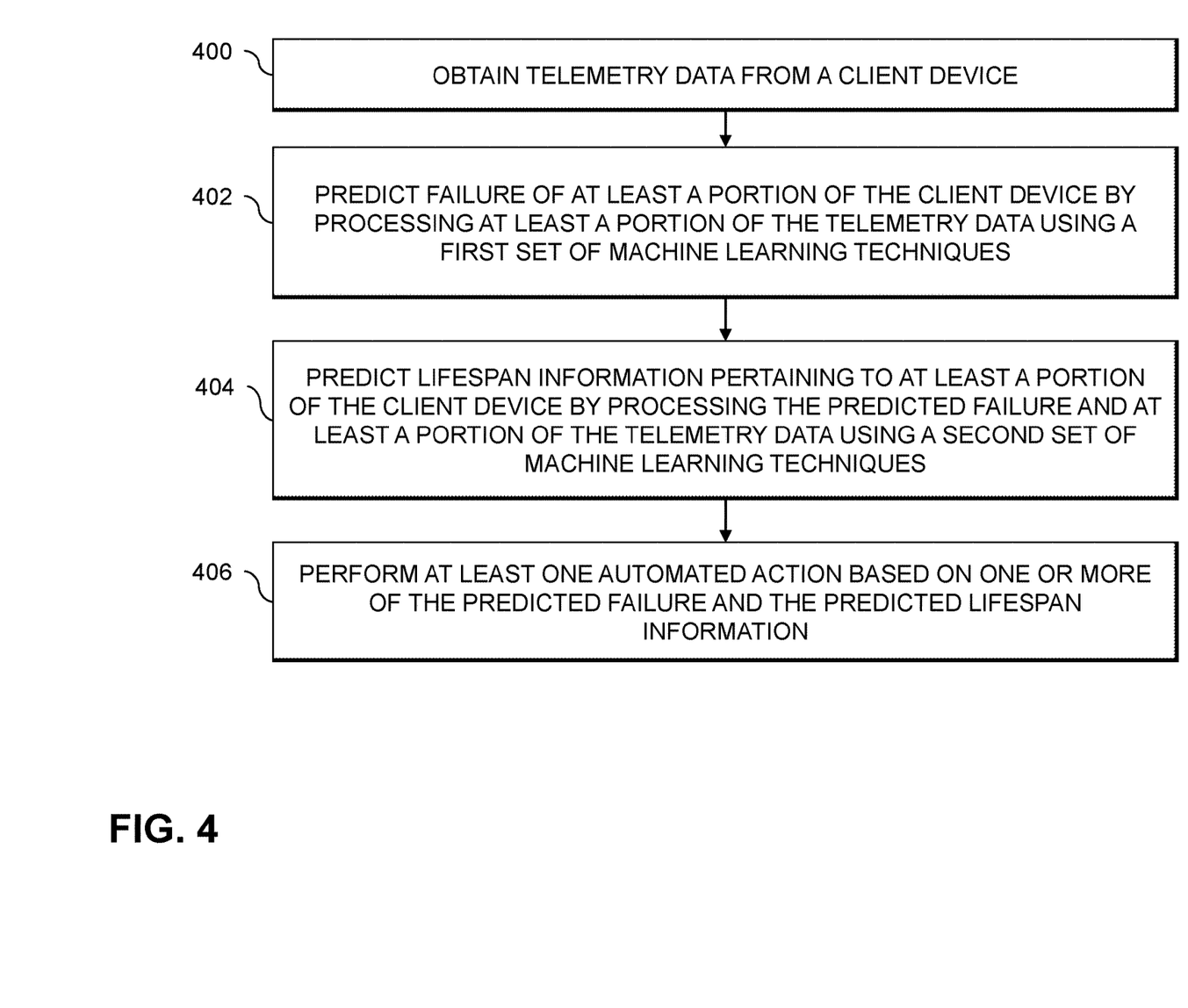
FIG. 4 is a flow diagram of a process for automatically predicting device failure using machine learning techniques in an illustrative embodiment.

FIG. 4 is a flow diagram of a process for automatically predicting device failure using machine learning techniques in an illustrative embodiment. It is to be understood that this particular process is only an example, and additional or alternative processes can be carried out in other embodiments.

In this embodiment, the process includes steps 400 through 406. These steps are assumed to be performed by the device failure prediction system 105 utilizing its modules 112, 114 and 116.

Step 400 includes obtaining telemetry data from at least one client device. Step 402 includes predicting failure of at least a portion of the at least one client device by processing at least a portion of the telemetry data using a first set of one or more machine learning techniques. In at least one embodiment, processing the at least a portion of the telemetry data using the first set of one or more machine learning techniques includes processing the at least a portion of the telemetry data using one or more Gaussian Naïve Bayes classifier algorithms. Further, such an embodiment also includes training the one or more Gaussian Naïve Bayes classifier algorithms using historical telemetry data, device-related data, environmental data, and utilization information.

Additionally or alternatively, in at least one embodiment, processing the at least a portion of the telemetry data using the first set of one or more machine learning techniques comprises processing the at least a portion of the telemetry data using one or more supervised machine learning models. Such an embodiment also includes training the one or more supervised machine learning models using historical telemetry data, device-related data, environmental data, and utilization information. By way of example, such a supervised learning algorithm can include a Gaussian Naïve Bayes algorithm, which uses the training data to predict one or more failures.

In one or more embodiments, the techniques depicted in FIG. 4 can also include determining a probability value attributed to the predicted failure based at least in part on the processing of the at least a portion of the telemetry data using the first set of one or more machine learning techniques.

Step 404 includes predicting lifespan information pertaining to at least a portion of the at least one client device by processing the predicted failure and at least a portion of the telemetry data using a second set of one or more machine learning techniques. In at least one embodiment, processing the predicted failure and at least a portion of the telemetry data using the second set of one or more machine learning techniques includes processing the predicted failure and at least a portion of the telemetry data using at least one gradient boosting regression technique. Also, such an embodiment can include training the at least one gradient boosting regression technique using historical telemetry data, device-related data, environmental data, and utilization information. By way of example, such an embodiment includes using a gradient boosting algorithm as a regression algorithm to calculate the lifespan of a device. Such an algorithm uses past data for training the model, and predicts the length of life for a device based at least in part thereon. The training data can include multiple dimensions such as make and model of device, manufacturer, start date, failure data, etc.

Step 406 includes performing at least one automated action based at least in part on one or more of the predicted failure and the predicted lifespan information. In at least one embodiment, performing the at least one automated action includes outputting at least one notification pertaining to the predicted failure to at least one customer relationship management system. Also, in one or more embodiments, performing the at least one automated action includes determining a dispatch date pertaining to at least a portion of the at least one client device based at least in part on the predicted lifespan information, and outputting the determined dispatch date to one or more of a parts planning entity, a services planning entity, a warranty entity, and a service level agreement entity. Additionally or alternatively, such an embodiment can include modifying an existing dispatch date pertaining to at least a portion of the at least one client device based at least in part on the predicted lifespan information, and outputting the modified dispatch date to one or more of a parts planning entity, a services planning entity, a warranty entity, and a service level agreement entity.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to processing dynamic device telemetry data using machine learning techniques to predict device failures and device lifespan information. These and other embodiments can effectively overcome inaccuracy problems associated with conventional device management techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
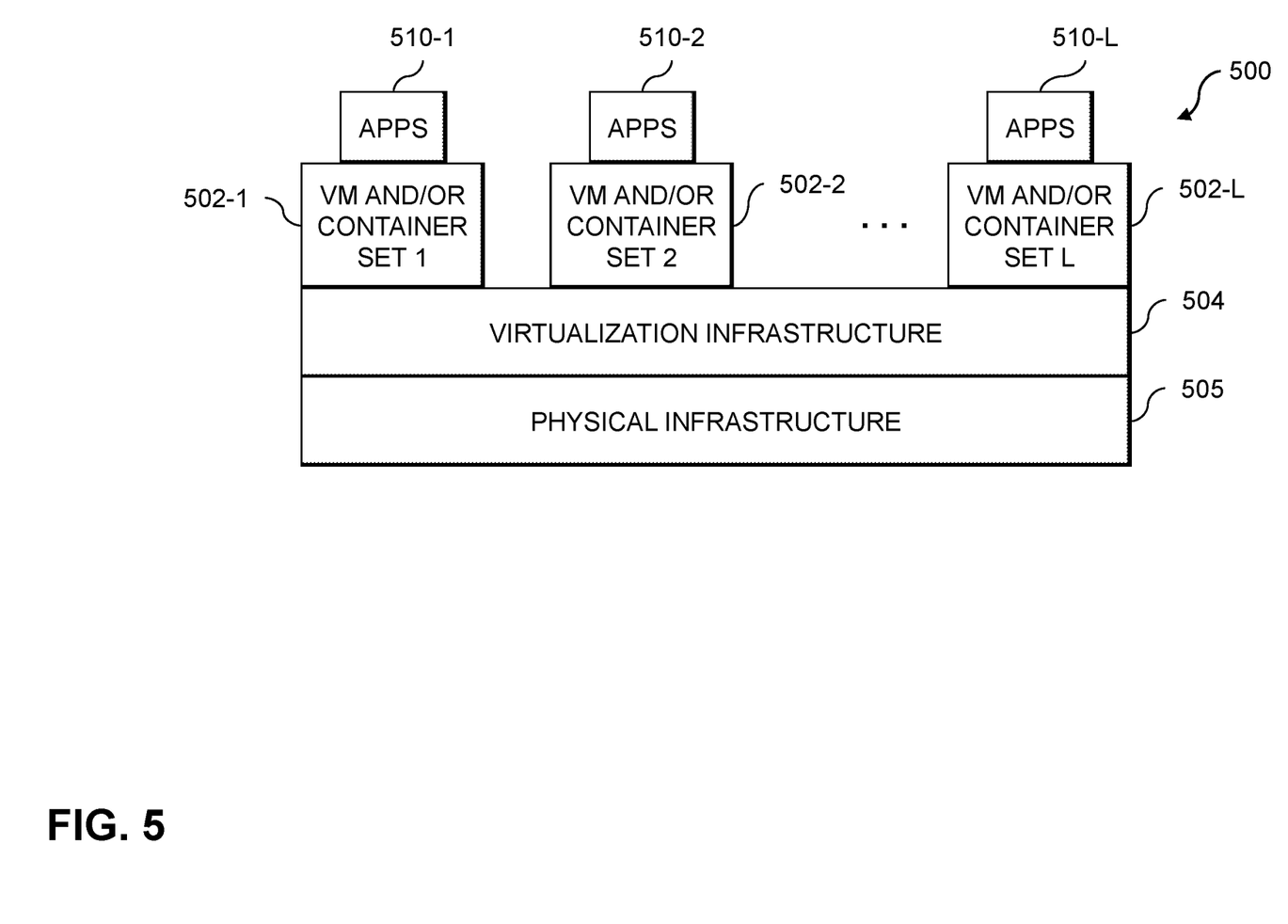
FIGS. 5 and 6 show examples of processing platforms that may be utilized to implement at least a portion of an information processing system in illustrative embodiments.
Figure 6:
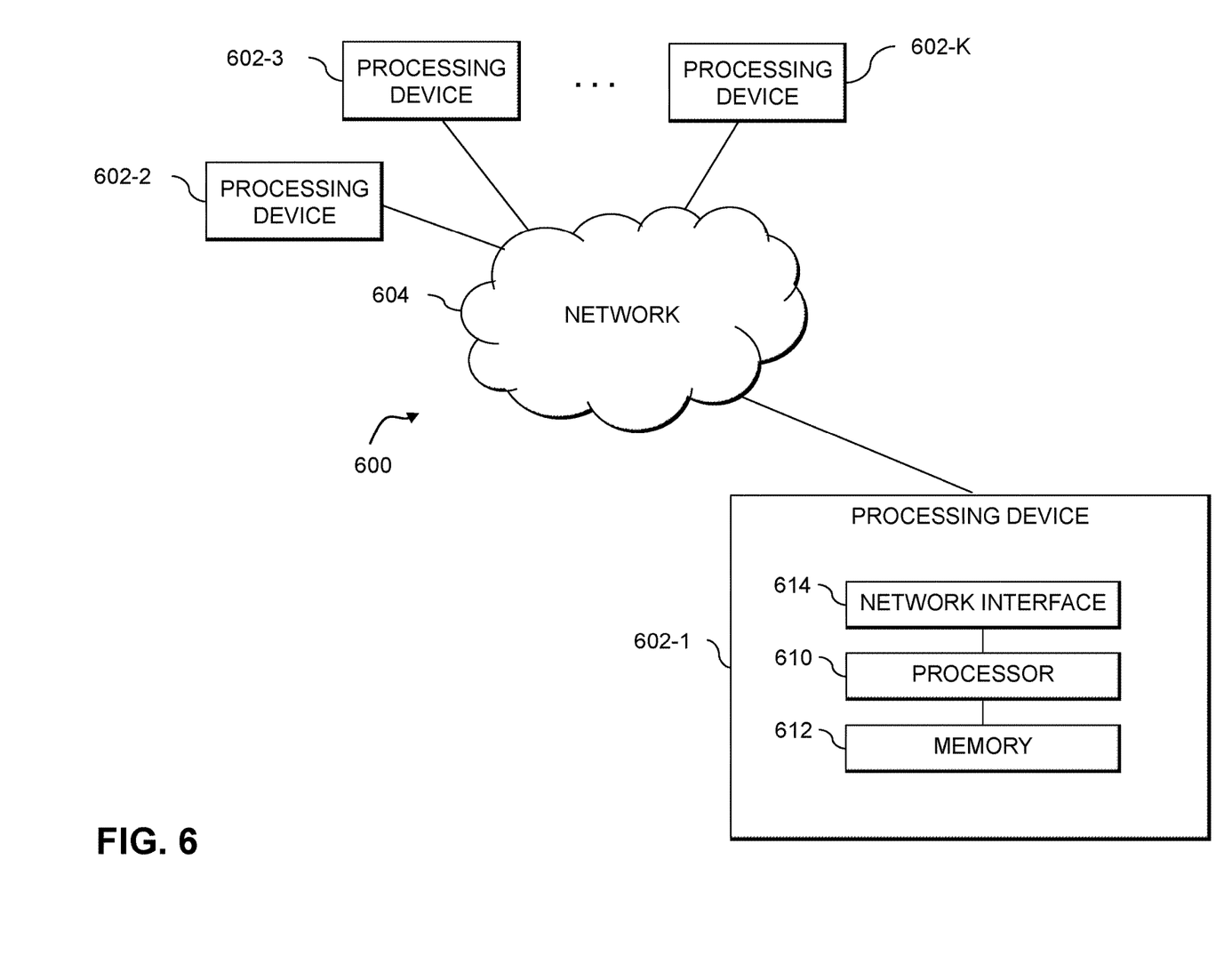

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining telemetry data from at least one client device;
    predicting failure of at least a portion of the at least one client device by processing at least a portion of the telemetry data using a first set of one or more machine learning techniques, wherein processing at least a portion of the telemetry data using the first set of one or more machine learning techniques comprises processing at least a portion of the telemetry data using one or more Bayes classifier algorithms in conjunction with one or more probabilistic supervised machine learning algorithms;
    predicting lifespan information pertaining to at least a portion of the at least one client device by processing the predicted failure and at least a portion of the telemetry data using a second set of one or more machine learning techniques; and
    performing at least one automated action based at least in part on one or more of the predicted failure and the predicted lifespan information;
    wherein the method is performed by at least one processing device comprising a processor coupled to a memory.

2. The computer-implemented method of claim 1, wherein processing the at least a portion of the telemetry data using the first set of one or more machine learning techniques comprises processing the at least a portion of the telemetry data using one or more Naïve Bayes classifier algorithms.

3. The computer-implemented method of claim 2, further comprising:
    training the one or more Naïve Bayes classifier algorithms using historical telemetry data, device-related data, environmental data, and utilization information.

4. The computer-implemented method of claim 1, further comprising:
    training the one or more probabilistic supervised machine learning algorithms using historical telemetry data, device-related data, environmental data, and utilization information.

5. The computer-implemented method of claim 1, further comprising:
    determining a probability value attributed to the predicted failure based at least in part on the processing of the at least a portion of the telemetry data using the first set of one or more machine learning techniques.

6. The computer-implemented method of claim 1, wherein processing the predicted failure and at least a portion of the telemetry data using the second set of one or more machine learning techniques comprises processing the predicted failure and at least a portion of the telemetry data using at least one gradient boosting regression technique.

7. The computer-implemented method of claim 6, further comprising:
    training the at least one gradient boosting regression technique using historical telemetry data, device-related data, environmental data, and utilization information.

8. The computer-implemented method of claim 1, wherein performing the at least one automated action comprises outputting at least one notification pertaining to the predicted failure to at least one customer relationship management system.

9. The computer-implemented method of claim 1, wherein performing the at least one automated action comprises:
    determining a dispatch date pertaining to at least a portion of the at least one client device based at least in part on the predicted lifespan information; and
    outputting the determined dispatch date to one or more of a parts planning entity, a services planning entity, a warranty entity, and a service level agreement entity.

10. The computer-implemented method of claim 1, wherein performing the at least one automated action comprises:
    modifying an existing dispatch date pertaining to at least a portion of the at least one client device based at least in part on the predicted lifespan information; and
    outputting the modified dispatch date to one or more of a parts planning entity, a services planning entity, a warranty entity, and a service level agreement entity.

11. A non-transitory processor-readable storage medium having stored therein program code of one or more software programs, wherein the program code when executed by at least one processing device causes the at least one processing device:
    to obtain telemetry data from at least one client device;
    to predict failure of at least a portion of the at least one client device by processing at least a portion of the telemetry data using a first set of one or more machine learning techniques, wherein processing at least a portion of the telemetry data using the first set of one or more machine learning techniques comprises processing at least a portion of the telemetry data using one or more Bayes classifier algorithms in conjunction with one or more probabilistic supervised machine learning algorithms;

to predict lifespan information pertaining to at least a portion of the at least one client device by processing the predicted failure and at least a portion of the telemetry data using a second set of one or more machine learning techniques; and to perform at least one automated action based at least in part on one or more of the predicted failure and the predicted lifespan information.

12. The non-transitory processor-readable storage medium of claim 11, wherein processing the at least a portion of the telemetry data using the first set of one or more machine learning techniques comprises processing the at least a portion of the telemetry data using one or more Naïve Bayes classifier algorithms.

13. The non-transitory processor-readable storage medium of claim 11, wherein processing the predicted failure and at least a portion of the telemetry data using the second set of one or more machine learning techniques comprises processing the predicted failure and at least a portion of the telemetry data using at least one gradient boosting regression technique.

14. The non-transitory processor-readable storage medium of claim 11, wherein the program code when executed by at least one processing device further causes the at least one processing device:

to determine a probability value attributed to the predicted failure based at least in part on the processing of the at least a portion of the telemetry data using the first set of one or more machine learning techniques.

15. An apparatus comprising:

at least one processing device comprising a processor coupled to a memory;

the at least one processing device being configured:

to obtain telemetry data from at least one client device;

to predict failure of at least a portion of the at least one client device by processing at least a portion of the telemetry data using a first set of one or more machine learning techniques, wherein processing at least a portion of the telemetry data using the first set of one or more machine learning techniques comprises processing at least a portion of the telemetry data using one or more Bayes classifier algorithms in conjunction with one or more probabilistic supervised machine learning algorithms;

to predict lifespan information pertaining to at least a portion of the at least one client device by processing the predicted failure and at least a portion of the telemetry data using a second set of one or more machine learning techniques; and to perform at least one automated action based at least in part on one or more of the predicted failure and the predicted lifespan information.

16. The apparatus of claim 15, wherein processing the at least a portion of the telemetry data using the first set of one or more machine learning techniques comprises processing the at least a portion of the telemetry data using one or more Naïve Bayes classifier algorithms.

17. The apparatus of claim 15, wherein processing the predicted failure and at least a portion of the telemetry data using the second set of one or more machine learning techniques comprises processing the predicted failure and at least a portion of the telemetry data using at least one gradient boosting regression technique.

18. The apparatus of claim 15, wherein performing the at least one automated action comprises outputting at least one notification pertaining to the predicted failure to at least one customer relationship management system.

19. The apparatus of claim 15, wherein performing the at least one automated action comprises:

determining a dispatch date pertaining to at least a portion of the at least one client device based at least in part on the predicted lifespan information; and outputting the determined dispatch date to one or more of a parts planning entity, a services planning entity, a warranty entity, and a service level agreement entity.

20. The apparatus of claim 15, wherein performing the at least one automated action comprises:

modifying an existing dispatch date pertaining to at least a portion of the at least one client device based at least in part on the predicted lifespan information; and outputting the modified dispatch date to one or more of a parts planning entity, a services planning entity, a warranty entity, and a service level agreement entity.

\* \* \* \* \*